(12) United States Patent
Tovkach et al.

(10) Patent No.: US 10,703,467 B2
(45) Date of Patent: Jul. 7, 2020

(54) VERTICAL TAKE-OFF AND LANDING AIRCRAFT

(71) Applicant: OBSHCHESTVO S OGRANICHENNOJ OTVETSTVENNOSTYU "AVIANOVATSII", Novomoskovsk, Tulskaya oblast (RU)

(72) Inventors: Sergei Evgenievich Tovkach, Tulskaya oblast (RU); Aleksei Viktorovich Shanin, Minskaya oblast (BY); Igor Chudakov, San Jose, CA (US)

(73) Assignee: OBSHCHESTVO S OGRANICHENNOJ OTVETSTVENNOSTYU "AVIANOVATSII", Novomoskovsk (RU)

( * ) Notice: Subject to any disclaimer, the term of this patent is extended or adjusted under 35 U.S.C. 154(b) by 223 days.

(21) Appl. No.: 15/899,381

(22) Filed: Feb. 20, 2018

(65) Prior Publication Data

US 2018/0178907 A1 Jun. 28, 2018

Related U.S. Application Data

(63) Continuation of application No. PCT/RU2016/000398, filed on Jun. 28, 2016.

(30) Foreign Application Priority Data

Aug. 20, 2015 (RU) .................................. 2015135229

(51) Int. Cl.
*B64C 27/08* (2006.01)
*B64D 27/24* (2006.01)
*B64C 29/00* (2006.01)
*B64C 39/02* (2006.01)
*B64D 35/02* (2006.01)

(52) U.S. Cl.
CPC .......... *B64C 27/08* (2013.01); *B64C 29/0025* (2013.01); *B64C 39/024* (2013.01);
(Continued)

(58) Field of Classification Search
CPC ... B64C 27/08; B64C 29/0025; B64C 39/024; B64D 27/24; B64D 35/02
See application file for complete search history.

(56) References Cited

U.S. PATENT DOCUMENTS

| | | | |
|---|---|---|---|
| 6,886,776 B2 | 5/2005 | Wagner et al. | |
| 7,159,817 B2 | 1/2007 | Vandermey et al. | |

(Continued)

FOREIGN PATENT DOCUMENTS

| | | |
|---|---|---|
| RU | 2001836 C1 | 10/1993 |
| RU | 108016 U1 | 9/2011 |

(Continued)

OTHER PUBLICATIONS http://www.e-volo.com/—pdf document, 7 pages, Nov. 1, 2018.

(Continued)

*Primary Examiner* — Justin M Benedik
(74) *Attorney, Agent, or Firm* — BCF LLP

(57) ABSTRACT

The present technology relates to the field of aircraft construction, and more specifically to vertical take-off and landing aircraft. The aircraft includes a bearing frame of a spatial structure, a seat, controls, moto-units, a control system, and a remote control system. The bearing frame is designed with a central portion and with at least two peripheral clusters. The central portion and the peripheral clusters of the frame are designed as a spatial structure. Each peripheral cluster is designed as a truss structure of at least three segments of the same type, which are interconnected. Inside each segment there is a moto-unit, which has at least one motor and at least one horizontal-rotation propeller.

20 Claims, 9 Drawing Sheets

(52) U.S. Cl.
CPC ............. *B64D 27/24* (2013.01); *B64D 35/02* (2013.01); *B64C 2201/027* (2013.01); *B64C 2201/108* (2013.01); *B64C 2201/141* (2013.01); *B64C 2201/146* (2013.01)

(56) References Cited

U.S. PATENT DOCUMENTS

| | | | |
|---|---|---|---|
| 8,393,564 | B2 * | 3/2013 | Kroo |
| 8,505,846 | B1 | 8/2013 | Sanders |
| 8,646,720 | B2 | 2/2014 | Shaw |
| 2003/0062443 | A1 | 4/2003 | Wagner et al. |
| 2006/0266881 | A1 | 11/2006 | Hughey |
| 2009/0008499 | A1 | 1/2009 | Shaw |
| 2011/0042509 | A1 | 2/2011 | Bevirt et al. |
| 2013/0020429 | A1 | 1/2013 | Kroo |
| 2013/0112804 | A1 | 5/2013 | Zhu |
| 2013/0311008 | A1 | 11/2013 | Kroo |
| 2014/0097290 | A1 | 4/2014 | Leng |
| 2014/0339372 | A1 | 11/2014 | Dekel et al. |
| 2016/0023754 | A1 | 1/2016 | Wiegand |

FOREIGN PATENT DOCUMENTS

| | | |
|---|---|---|
| WO | 2004065208 A2 | 8/2004 |
| WO | 2015/092389 A1 | 6/2015 |

OTHER PUBLICATIONS hittp://www.moller.com/—pdf document, 13 pages, Nov. 1, 2018.
http://www.hover-bike.com/MA/product/hoverbike-helicopter/—pdf document, 3 pages, Nov. 1, 2018.
http://aerofex.com/theaerox/—pdf document, 1 page, Nov. 1, 2018.
https://www.youtube.com/watch?v=Dd2f_2fgLoo&feature=youtu.be&t=35; "Eccentric Inventor Creates his own Flying Drone Car", accessed on Jun. 14, 2019, Screen Shot pdf 3 pages.
International Search Report with regard to PCT/RU2017/050053 dated Oct. 26, 2017.
https://www.instagram.com/p/Bul1h7Inqoj/?utm_source=ig_web_copy_link accessed on Jun. 14, 2019, Screen Shot pdf 8 pages.
https://www.instagram.com/p/BxSX2tlHiis/?utm_source=ig_web_copy_link accessed on Jun. 14, 2019, Screen Shot pdf 2 pages.
https://www.trekaero.com/ accessed on Jun. 14, 2019, Screen Shot pdf 2 pages.
International Search Report with regard to PCT/RU2016/000398 dated Nov. 17, 2016.
English Abstract for RU 108016 retrieved on Espacenet on Feb. 15, 2018.
English Translation of Description retrieved on Espacenet on Feb. 15, 2018/Patent Disclosure (translation made on Feb. 1, 2018) for RU 2001836.
Office Action with regard to the counterpart U.S. Appl. No. 16/182,107 dated Nov. 29, 2019.

* cited by examiner

VERTICAL TAKE-OFF AND LANDING AIRCRAFT

CROSS-REFERENCE

The present application claims convention priority to Russian Utility Patent Application No. 2015135229, filed on Aug. 20, 2015, entitled "ЛЕТАТЕЛЬНЫЙ АППАРАТ ВЕРТИКАЛЬНОГО ВЗЛЕТА И ПОСАДКИ". This application is incorporated by reference herein in its entirety. The present application is a continuation of International Patent Application no. PCT/RU2016/000398, filed on Jun. 28, 2016, entitled "VERTICAL TAKE-OFF AND LANDING AIRCRAFT". This application is incorporated by reference herein in its entirety.

FIELD OF THE TECHNOLOGY

The present technology is in the field of aviation, and in particular the present technology relates to stationary take-off and landing aerial vehicles.

BACKGROUND

A widely known vehicle and precedent to this present technology is the "flying motorbike" (see patent RU 108016, dated Oct. 29, 2010) equipped with a parachute safety system, featuring an X-frame, 4 symmetric propellers, and an engine. Some of the device's flaws include: that the flat beam frame does not provide the necessary rigid construction resilient to large mass propeller processional and nutational vibration, which leads to resonant vibrations, entails the formation of wear defects in the construction and renders the objective of stabilizing the vehicle in the air more difficult, the failure of at least one of the four propellers (as well as any of the construction's other elements providing for the propeller's operation) would lead to an accident; meanwhile, the parachute safety system would not prevent such an accident, but rather only lessen the severity of its consequences. The parachute safety system is deemed likely ineffective when flying at low altitudes. The broad diameter and structure propellers prevent their ability to be quickly stopped in the event of an accident.

Yet another well-known technology relevant to this technology's background is the flying motorbike for the Aero-X Hoverbike project http://aerofex.corn/theaerox/, featuring an internal combustion engine and two power propellers also featuring deflectable aerodynamic control. The flaws of this device include that the actuation of both propellers is performed using a single propeller, meanwhile the two-propeller scheme is not resilient, and failure in the engine, as well as any interruption in the operation of the propellers, transmission, aerodynamic control, or other systems enabling their operation, would lead to immediate spinning in the air and this would render it impossible to be saved, along with the pilot's safe escape. The flat frame does not provide for the rigidity that the construction needs or resilience to the large mass propellers' processional and nutational vibrations, which leads to resonant vibrations, entails the formation of wear defects in the construction, and renders the objective of stabilizing the vehicle in the air more difficult. The broad diameter and structure of the propellers prevent it from being able to be quickly stopped in the event of an accident.

Also a well-known predecessor of this technological background is the flying motorbike from the "MA Hoverbike Helicopter" project http://www.hover-bike.com/MA/product/hoverbike-helicopter/, featuring two or four propellers in different configurations. The flaws of this device include that the propellers' actuation is performed from a single propeller, meanwhile the two-propeller scheme is not resilient, and failure in the engine, or any disruption in the operation of the propellers, transmission, aerodynamic controls, or other systems enabling their operation, would lead to the vehicle's immediate spinning in the air and would render it impossible to be saved, as well as the pilot's safe escape. The same would be fair to say of the four-propeller version, since the vehicle could not continue flight in the case of the failure of at least one propeller. The flat frame does not provide for the rigidity that the construction needs, nor the resilience to the large mass propellers' processional and nutational vibrations, which leads to resonant vibrations, entails the formation of wear defects in the construction, and renders the objective of stabilizing the vehicle in the air difficult. The large diameter and structure of the propellers prevent it from being able to be quickly stopped in the event of an accident.

The aerial vehicle known as the Moller M200G Volantor (US) http://www.moller.com/, features a platform, a fuselage, eight Wankel rotary engines, eight propellers in a ring rim, a cabin, and a pilot's seat. The flaws of this device entail a single fueling system and engine-powering tank, the failure of which would lead to all of the engines stopping at once; meanwhile, autorotation would be impossible due to the short diameter of the propellers and the inhibitory forces in the engines, the redundancy of which would not provide for a safe flight. The great difficulty in controlling the Wankel engines, due to their slow response time compared to electric motors, as well as the necessity to constantly keep up a high level of revolutions in order to preserve the optimal functioning of the engine utilized, require a propeller pitch control system to be used. This system increases the vehicle's mass, reduces its reliability, and adds a superfluous serviceable node to each motor. The combination of the flaws in the utilized engine system leads to vehicle bobble even without any wind (very noticeable on the published trial videos) with the prospect of the loss of stabilization and an accident. Engine overheating and fires on numerous occasions forced the designers to have to switch from oil to a toxic mixture of water and ethanol to serve as the fuel, which did not solve all of the fire safety issues, but did, nevertheless, manage to reduce the lower power-to-weight ratio and the vehicle's response time. The underwhelming reliability, flying life, and overhaulability of the Wankel engine along with the pitch control system, the underperforming production technology of the vehicle, its bulky configuration in the form of a plate with a high amount of surface area exposed to the wind, and the high overall cost of the vehicle prevented it from entering mass production.

There is known VC200 aerial vehicle by e-volo http://www.e-volo.com/, featuring 16 horizontally placed electric engines with propellers, a pilot cabin, and an electrical battery in it along with a parachute safety system for the whole vehicle. The flaws of the closest precedent to the presented technology entail its dependent electric power system, where all of the engines are powered by a single battery with a long main lead from the only battery to the engines, which does not ensure the flight's safety via redundancy, since failure of the battery would lead to a failure of all of the engines at once and autorotation landing would be impossible due to the short diameter of the propellers and the inhibitive forces in the actuation electric engines. The heavy construction of the fuselage with the propeller frame carbon elements producing a kink does not ensure durability and rigidity in the construction compared to the spacious frame constructions, they add mass to the vehicle, and meanwhile the fuselage parts themselves are unique in their construction and cannot be manufactured by a user independently or invented by anyone other than the vehicle's producer. The combination of the flaws outlined above cause the cost of the vehicle to rise and prevent the vehicle from being able to lift up more than its own weight into the air. The aviation controllers require helicopter flying skills of the pilot. The parachute safety system is deemed likely ineffective when flying at low altitudes.

SUMMARY OF THE TECHNOLOGY

Embodiments of the present technology may be implemented in the stationary take-off and landing aerial vehicle's higher level of fail-safety, overhaulability, and safety. Embodiments of the present technology may be implemented as a means of personal transportation, a flying crane, a skydiving platform, a means for scouting land or attacks, an unmanned aerial vehicle (UAV), or a remotely-piloted aerial vehicle (RPAV).

Embodiments of the present technology may be implemented by the aerial vehicle's stationary take-off and landing entailing the space construction's basic essential frame, seat, controllers, motor placement, control system, and remote control system; meanwhile, the basic essential frame is manufactured with a center section and at least two peripheral clusters, whereby the center section and the peripheral clusters are manufactured with a space construction with each peripheral cluster manufactured with a lattice structure featuring at least three matching segments connected to each other. Meanwhile, built into each segment is a motor installation featuring at least one engine and at least one horizontal rotation propeller.

In accordance with the first broad aspect of the present technology, there is provided a vertical take-off and landing aerial vehicle comprising:

a base frame, the base frame including a central segment and at least two peripheral clusters, the central segment and the at least two peripheral clusters being implemented as a spacious construction, each peripheral cluster of the at least two peripheral clusters including at least three segments connected to each other; a seat mounted within the base frame;

a control system for controlling operations of at least a portion of the vertical take-off and landing aerial vehicle; and a respective motor installation located in each segment of the at least three segments, the respective motor installation containing at least one engine and a horizontal rotation propeller.

In some implementations of the vertical take-off and landing aerial vehicle, the at least three segments are organized in a truss element, and wherein the at least three segments are limited in volume by truss elements formed by at least three facets; and wherein two neighboring truss elements share at least one facet manufactured as a unitary construction.

In some implementations of the vertical take-off and landing aerial vehicle, the at least three segments are organized in a farm element, and wherein the at least three segments are limited in volume by farm elements formed by at least three facets; and wherein two neighboring farms share at least one facet manufactured as a unitary construction.

In some implementations of the vertical take-off and landing aerial vehicle, the respective motor installation is mounted in line and symmetrical in at least one horizontal plane to each other respective motor installation.

In some implementations of the vertical take-off and landing aerial vehicle, the respective motor installation is mounted in an off-set relationship relative to at least one other respective motor installation, the offset being in a horizontal plane.

In some implementations of the vertical take-off and landing aerial vehicle, the at least one engine is an electric engine; and wherein each of the respective motor installation comprises an electric power source mounted locally onto the respective motor installation, and wherein the electric power source is used to provide power to the associated electric engine, and wherein the electric power source is located in an air flow of the associated horizontal rotation propeller.

In some implementations of the vertical take-off and landing aerial vehicle, the electric engine comprises two electric engines coaxially located.

In some implementations of the vertical take-off and landing aerial vehicle, the vehicle further comprises an emergency power source switching system configured to switch powering of a given motor installation to a power source of another motor installation via a commutator system cable.

In some implementations of the vertical take-off and landing aerial vehicle, the electric power source comprises at least one of: fuel cells, radioisotope and nuclear electric power sources.

In some implementations of the vertical take-off and landing aerial vehicle, each respective motor installation is implemented as an independent unit with its own power source and a local instrumentation set configured to receive commands from a central control unit.

In some implementations of the vertical take-off and landing aerial vehicle, each respective motor installation comprises a pneumatic engine; and wherein the powering of each pneumatic engine is performed from a compressor installed in the central section, the powering being executed via a separate conduit pipe with a shutters system with electric actuation; and wherein the control system is configured for regulating the feeding of the compressed gas to pneumatic engines and their force.

In some implementations of the vertical take-off and landing aerial vehicle, the conduit pipes pass through either the inside or outside of the frame elements.

In some implementations of the vertical take-off and landing aerial vehicle, the compressor further comprises a pneumatic battery.

In some implementations of the vertical take-off and landing aerial vehicle, each pneumatic engine is an independent unit with its own pneumatic energy transfer channel from the compressor and the instrumentation set, receiving commands from a central control unit.

In some implementations of the vertical take-off and landing aerial vehicle, the vehicle further comprises a duplicate compressor and duplicate conduit pipes with independent shutters, the duplicate compressor being installed inside the central section of the aerial vehicle frame along with the primary one.

In some implementations of the vertical take-off and landing aerial vehicle, the central section houses seat, hand and foot controllers.

In some implementations of the vertical take-off and landing aerial vehicle, controllers are manufactured with a possibility of dismantlement along with a quickly removable connection and their use as a remote control for control of the vehicle at a distance in a drone mode.

In some implementations of the vertical take-off and landing aerial vehicle, each respective motor installation is controlled individually; and wherein each peripheral cluster comprises an equal number of: (i) motor installations having clockwise-rotatable propellers and (ii) motor installations having counterclockwise rotatable propellers.

In some implementations of the vertical take-off and landing aerial vehicle, each respective motor installation is controlled individually; and wherein each peripheral cluster comprises an even number of counterclockwise rotation propellers.

In some implementations of the vertical take-off and landing aerial vehicle, the vehicle further comprises automatic control system operating in at least one of a pilot mode, an autonomous drone mode, and in a remote control mode.

In one particular case, the manufacture of the presented technology entails space frame peripheral clusters consisting of matching segments featuring completely or partially matching parts, whereby one segment's parts may be transferred and used in another segment.

In one particular case, the manufacture of the presented technology entails a space frame construction featuring nodes connected by a quickly detachable fixture of matching parts.

In one particular case in the manufacture of the presented technology, the aerial vehicle peripheral cluster segment is limited in the volume of its truss members, forming at least three facets, whereby at least one segment facet is manufactured as the same as a facet of the neighboring segment.

In one particular case, the manufacture of the presented technology's frame segment features motor installations situated in line with and symmetrical to each other along at least one horizontal plane.

In one particular case, the manufacture of the presented technology's frame segment features motor installations situated in checkerboard fashion, located off-side each other along at least one horizontal plane.

In one particular case, the manufacture of each of the presented technology's motor installations contains at least one electric motor, meanwhile powering of the electric motor is performed by at least one electric power source placed right on the motor installation and located in the motor installation engine's propeller airflow.

In one particular case, the manufacture of presented technology's motor installation features at least two electric engines, each placed in line with each other.

In one particular case, the manufacture of the presented aerial vehicle technology entails the ability to switch the powering sources for other motor installations while in the air via a system switch cable.

In one particular case, the manufacture of the presented technology's electric power source is performed in the form of fuel cells, radioisotope and nuclear electric powering sources.

In one particular case, the manufacture of the presented technology entails each motor installation having an electric engine and functioning as an independent unit with its own power source and monitoring instrumentation, receiving commands from the central control segment.

In one particular case, the manufacture of the presented technology features each motor installation containing an air-motor, whereby the powering of each air-motor of each motor installation is performed from the compressor installed in the center section of the aerial vehicle via a separate conduit pipe with an electric actuation shutters system regulating the compressed gas' feeding to the air-motor and their power, receiving commands from the central control segment of the aerial vehicle.

In one particular case, the manufacture of the presented technology features conduit pipes passing inside or outside the frame elements.

In one particular case, the manufacture of the presented technology includes the compressor featuring an extra air accumulator.

In one particular case, the manufacture of the presented technology includes each air motor installation functioning as independent units with their own pneumatic power feeding channel from the central compressor and monitoring instrumentation, receiving commands from the central control segment.

In one particular case, the manufacture of the presented technology additionally entails duplicate compressors and duplicate conduit pipes with independent shutters, whereby the duplicate compressor is installed inside the center section of the aerial vehicle's frame along with the primary one.

In one particular case, the manufacture of the presented technology features a pilot seat in the central section of the frame, control system controllers, hand and feet controllers, a nose wheel, compressor, and its systems.

In one particular case, the manufacture of the presented technology features operational controls with the possibility of dismantlement with a quick connector and their use as a remote control to guide the hardware at a distance in drone mode.

In one particular case, the manufacture of the presented technology features each motor installation controlled individually; meanwhile, each peripheral cluster is manufactured with an even number of motor installations and propellers, which rotate clockwise and motor installations whose propellers rotate counterclockwise.

In one particular case, the manufacture of the presented technology features each motor installation controlled individually, meanwhile each peripheral cluster is manufactured with motor installations containing an even number of propellers rotating counterclockwise.

In one particular case, the manufacture of the presented technology contains a system for maintenance a specific altitude, course, route, and position in space.

In one particular case, the manufacture of the presented technology contains an automatic control system operating in pilot mode, autopilot mode, and remote control mode.

In one particular case, the manufacture of the presented technology features a suspension device at its center of mass for lifting and transporting cargoes on an external mount.

In one particular case, the manufacture of the presented technology features peripheral clusters with the ability for anterior and rear space scanning segments to be installed, auxiliary devices, and illumination devices.

BRIEF DESCRIPTION OF THE DRAWINGS

The parts, characteristics, and also the advantages of this technology are presented in below in the manufacture options of the presented stationary take-off and landing aerial vehicle, using drafts demonstrating.

Figure 1:
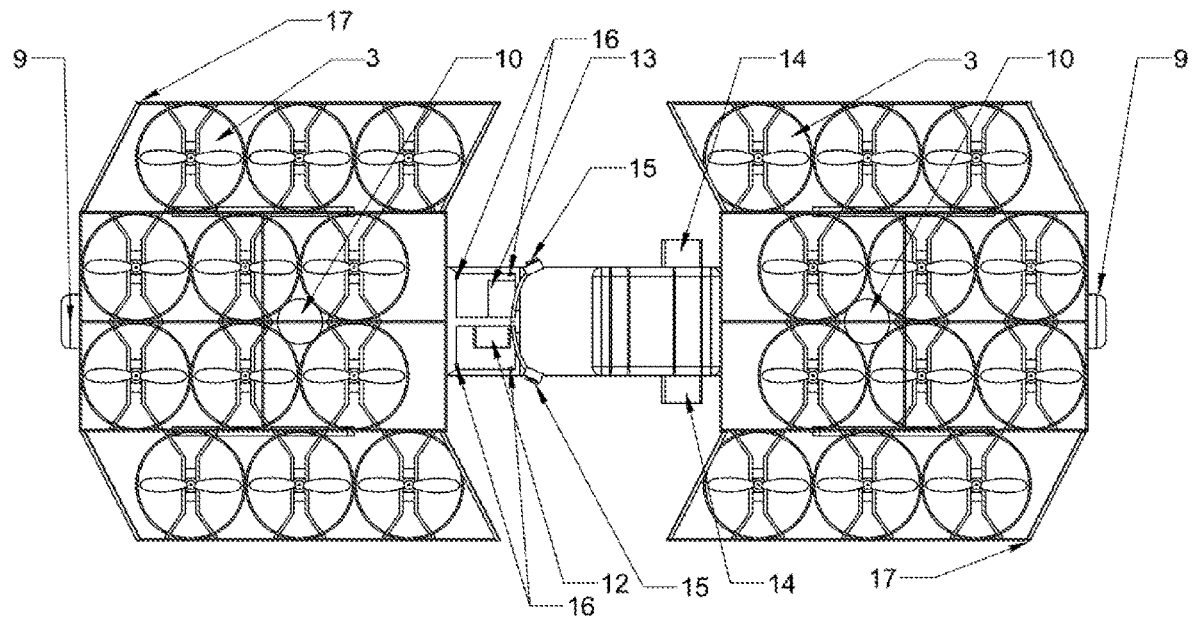
FIG. 1 depicts a top view for the one-engine embodiment of the vertical take-off and landing aerial vehicle in the motor installation.

Denoted numerically in the figures are the following features:

1—engine, 2—electric power source (for the electric actuation version), 3—motor installation as part of the cluster, 4—frame, 5—nose wheel segment, 6—pilot seat, 7—landing gear, 8—compressor (for the air-powered actuation option), 9—ultrasound distance gage with radar, 10—auxiliary power source, 11—autopilot, 12—nose wheel segment battery, 13—steering column control segment with radio transmitter, 14—control pedals, 15—wheel control handles, 16—quick removal latches for steering column attachment, 17—frame nodes, 18—engine controller, 19—propeller, 20—propeller actuation shaft, 21—compressed gas inlet, 22—burnt gas outlet, 23—node port, 24—insertion with jaw and collet locking, squeezing the frame element and the frame actuation element into a round shape, if it is not originally round, 25—elastic hub providing for the compression of the frame element, as well as having an extension to the end of the hub, providing a means to compensate for the frame element's side curvature, 26—screw, 27—frame element (brace, leg).

DETAILED DESCRIPTION OF THE NON-LIMITING EMBODIMENTS

The presented aerial vehicle construction contains clusters, each consisting of three or more motor installations and each with a minimum of one motor, whether electric or air-powered, and at least one horizontal rotary propeller, independent of each other mechanically and electrically, controlled individually, controlled equally clockwise and counterclockwise (if there is more than one propeller). Each motor installation contains an individual power source or uses an individual power transmission channel. The failure of one or several of the motor installations will not lead to turnover or spinup of the vehicle, since the lost thrust and the spinning aspect are automatically switched to the cluster's operating motor installations under the condition of a sufficient supply of power in the operating motor installations, meanwhile the operating motor installations are fully independent of the failed ones. This renders the installation of additional emergency systems unnecessary, both for the pilot and the vehicle as a whole. The fail-proof objective is achieved in the entire diapason of flight altitudes. The short diameter and low mass propellers can be quickly stopped, both by using the engine's natural brakes and by force by creating a reverse force engine, which achieves safety in operation.

The vehicle' safety system is also implemented, primarily, with a group of optical sensors situated right on the propellers, which provide a signal (in the case that objects enter the propeller zone) for an emergency stop for the affected propeller. In the case that the vehicle is operating under conditions of extreme dustiness, the optical sensors may be replaced by capacitive or radio location sensors, meanwhile the radio location sensors cover a greater sensing area and the capacitive ones provide greater distinction. Secondarily implementing this is the optical transmitters system inside the hollow elements of the frame consisting of heads and optical signals transmitters operating constantly throughout the flight. In the case that the optical connection channel frame element fractures, the central control segment (autopilot) (also referred to herein as "central control unit") receives a signal as to the location where the frame was damaged.

The essential frame (also referred to herein as "base frame") of the expansive space frame aerial vehicle provides the necessary rigidity with a low weight. The ease of repair it has is achieved on account of the vehicle' segment construction with a large amount of repeating elements as well as a minimal amount of mechanical mobile and deteriorating parts and servicing points. Depending on the configuration, the aerial vehicle can feature electric or air-powered actuation, which achieves its low operation cost.

The stationary take-off and landing aerial vehicle (AV) consists of the necessary frame, an automatic control system, manual controls, a pilot seat, and motor installations combined into clusters and auxiliary systems.

The aerial vehicle's frame is manufactured as a space construction with a central section and sections situated in front of and behind the aerial vehicle relative to the flight direction. Meanwhile, the central section of the aerial vehicle frame entails a frame and it's designed for the installation of controls, a pilot seat, a control system (autopilot), hand and feet controls, and a removable steering segment also fulfilling the role of a remote control of the vehicle, the compressor (in the air-powered manufacture version), and its systems. The shape of the central segment is determined by the pilot placement's ergonomics depending on his/her mass, height, and necessity to carry ammunition.

The front and rear sections of the frame are designed for placing motor installations, primary and reserve power sources, electric and pipe conduits, anterior and rear space scanning segments, and auxiliary devices, such as lights, bumpers, etc. These frame sections entail supports and are implemented in the form of a set of matching segmented connected to each other, placed inside which are matching motor installations, forming, jointly with the frame, the anterior and rear cluster of motor installations; meanwhile, no more than one motor installation are installed in a segment. The area of the frame is called a segment, limited by the volume of the frame elements (braces, legs, power belts, and nodes), but not featuring them on the inside and having at least three facets; meanwhile, at least one facet matches one of the neighboring segment. Meanwhile, the neighboring segments are fully or partially identical according to the frame elements used among them (braces, legs, power belts, and nodes), which provides a basis to use a limited number of matching parts in the motor installations' cluster construction, as well as transfer these parts between segments, which renders repair easy. This meanwhile also provides for flexibility in the construction of different load capacities of vehicles, since the number of segments (and the motor installations in them) can easily be increased as a continuation of the existing frame (cluster). The shape of the segments and procedure of their installation is chosen in such a way as to minimize the free space between the motor installations. Linear placement is admissible, where the motor installations are situated along a single plane, symmetrical to each other and placed in a zigzag pattern, where the motor installations are situated off-side each other in horizontal and/or vertical planes, which is a more universal and preferable option.

The aerial vehicle contains at least two clusters; meanwhile each cluster contains at least three motor installations. The number of motor installations in a cluster is determined based on the necessary load capacity of the vehicle and the force each motor installation contains.

The frame of the aerial vehicle is manufactured out of light specialized materials, such as carbon, aluminum, duralumin, or titanium (carbon is preferable) and entails a spacious construction out of round, oval, and rectangular section braces connected to the frame via nodes with fixtures. The location of the fixtures is determined by the quantity and shape of the braces matching the nodes, in the angles they match, as well as the braces section. According to this, connection points (ports) are created on the node surface in the form of a round cylinder with a thread. In the case of hollow brace actuation, the port contains a pin, the shape and section of which corresponding to the internal section of the hollow brace. The brace is brought to the tie-in point (placed on the pin if it's hollow) and then an elastic head out of soft material (rubber, polyethylene, silicon, elastic plastic, whereby rubber is the most preferable from a price and freeze resistance standpoint) is placed on it, in shape corresponding to the external shape (section) of the brace, meanwhile on top is an insertion with a collect fixture and a jaw, in addition to a screw and a brace, rendering the brace shape round, unless the external shape (section) of the brace is originally round, and is fastened with a screw. Under the pressure of the screw, the elastic head is deformed width-wise and reliably compresses the brace at the node, additionally attaching via the insertion's collet fixture, rendering the connection demountable and easy to repair. The braces themselves are manufactured out of standard type areas and sections broadly represented on the market from different producers, which enables their purchase by users regardless of the AV and independent manufacture of the necessary brace out of them. The node, port, insertion, and screw are manufactured out of the same material as the frame. If mobility in the node isn't required, the fastening connection can be replaced by adhesion, welding, or riveting at the tie-in points, whereby the preferable version is adhesion as a universal one and not violating the structure of the node and brace as a connection option.

The necessary rigidity and protection of the pilot and the influence of the rotating propellers around them, or their fragments in the event of destruction, is achieved via the spacious structure of the frame and the protective barriers of the propellers located inside the frame segments. Motor installations are assembled on a handling fixture manufactured preferably out of the same material as the frame and using this handling fixture, they are fastened to the frame in one of the ways described for the node. Also attached to the frame are an electric and pipe conduit, transmitters, vehicle transmitters and systems, the nose wheel, the pilot seat, and the power and energy sources. Passing inside the hollow segments of the frame are optical system control channels of the frame integrity, and also a conduit can possibly be passed through (electric and pipe), in cases where heightened protection is required of the conduit from the external mechanical influences.

For the first technology performance option, the motor installation contains one or more electric engines situated in line with each other and connected to them via horizontal rotation propellers. Powering of the engines is implemented from a single power source (PS) or a group of PS situated directly on the attachment fitting of the engine and located in the airflow from the propeller of this motor installation. Auxiliary PS can also be used, situated outside the motor installation and powering several motor installations at once, but not all from one PS. The placement of auxiliary PS is possible inside the hollow frame elements, in the free space between the cluster propellers, over and under the motor installations. It is preferable for it to be situated in the free space between the cluster propellers.

Each motor installation contains an individual engines controller taking commands from the central control segment (autopilot) of the aerial vehicle and implementing control of the motor installation electric engines, failure control, and control of correspondence to the set engine operation mode and the motor installation PS, using a sensor for the current, voltage, temperature, revolutions, and vibrations. The current sensors are situated at the entry to the motor installation via an electric scheme and measure the consumption of the PS flow that the motor installation amounts to. The voltage sensors are situated on the printed board of the controller and are connected to the measured points in the motor installation: the incoming PS voltage, voltage on the engine, and the electronic controller elements power voltage. The revolutions sensors are located on the engines and measure the revolutions and factor of rotation due to a change in the magnetic field in the engines during rotation. The temperature sensors are located on the printed board of the controller and in controlled points: the PS, the engine coverings, and the power keys. The vibration sensors are located at the points the engines are attached to the frame at. In the case that PS refilling is used, the engine controller also implements control of filling the PS of the motor installation. Thus, each motor installation is an independent functional unit.

A cable is passed through between the central segment (autopilot) and the motor installations, through which control commands (primary channel) are transmitted from the autopilot situated in the center of mass of the aerial vehicle to the motor installations and a slow charge from the PS motor installations is implemented in small points in the case that rechargeable PS are used. There exists the ability to switch the power source from neighboring motor installations to the necessary motor installation via the commutators system situated in the motor installations via this cable. Quick charging via large points is implemented by connection of the charging device directly to the motor installation PS.

The reserve control channel (commands transmission) to the motor installations is implemented either via a different cable passed through a different route (to avoid simultaneous damage of both cables) or via a radio channel; meanwhile, the radio channel version provides a basis to minimize the weight of the cable and the cable option improves the jamming resistance of the channel. The cables are passed through via a matrix method, where one control channel has cables passed through it, going transversely to the vehicle' symmetry axis; meanwhile, the second channel is lengthwise (such a linkage is possible on account of the cluster construction of the front and rear sections of the frame). In this case, two cases suit each motor installation from different sides and without repeating areas of the linkage route). In the case that a radio channel is used, radio transmitters are installed in each motor installation and in autopilot. Used for synchronization of transmission is protocol resolving conflicts based on the transmitter's priority. Autopilot features the highest priority and then the priorities are distributed between the motor installations from the highest to the lowest, whereby highest priority is given to the motor installations that are farthest from the center of mass to make the largest investment in controlling influence on the vehicle on account of the largest level to the center of mass.

Use of the generators and turbo generators of all types, batteries of all types, chemical current sources of all types, fuel cells of all types, radioisotope and nuclear element powering of all types as the PS is possible. Installation and connection of the above-listed PS types are implemented according to the manufacturer plant manual relative to the PS model used. The rechargeable chemical current sources (batteries) are considered preferable.

For the second option of the technology's manufacture, the motor installation entails an air-powered engine (also referred to herein as "pneumatic engine") situated horizontally with a horizontal rotation propeller connected to it and the exhaust of the burnt gas released below.

The powering of each air-powered engine of each motor installation is implemented from the compressor installed in the central section of the aerial vehicle via the conduit pipes and the shutters system with electric actuation regulating the feeding of the compressed gas to the air-powered engines and their power, receiving commands from the central control (autopilot) segment of the aerial vehicle. The compressor entails an internal combustion engine or a turbo generator with a compressed air segment powered by fuel from a tank situated above the compressor and attached to its frame. For time redundancy needs, the compressor contains an air-powered battery situated to the side of the compressor and attached to its frame, designed for temporary powering of the engines in the case of the main compressor's failure. Switching to the air-powered battery occurs automatically with the help of a three-way shutter installed on the air-powered battery in a rift of the conduit pipe between the air-powered battery and compressor, bleeding into the engines' conduit pipes powering and reacting to the inequality of pressures on both sides (the compressor and the air-powered battery), switching to the side that is the source of greater pressure. Most justified as assuming the role of the compressor is the use of air-powered auxiliary (APU) aviation technology force installations, such as the domestic AI-9 or GTCP36 engine and other similar ones.

Compressed air from the compressor arrives to the air-powered engines via independent conduit pipes, each conduit pipe to its own engine passing inside or outside the frame elements; meanwhile, the internal linkage improves the protection of the conduit pipes, as the external linkage does for cooling. External linkage is preferred to render it easier to repair. The air-powered engines' control shutters are located at both ends of each conduit pipe; meanwhile, one of the pair of shutters can be discrete, intended only for choking the emergency conduit pipe and the second must be regulatory. The autopilot gives commands to the engine controller and it controls the degree that the regulatory shutters are opened in by way of changing the electrical signal cables that lead to them, all the while regulating the gas expenditure in this channel and, consequently, bringing power and thrust to the air-powered engine of this motor installation.

The controller installed onto the air-powered engine implements uninterrupted control of the operation of the air-powered engine based on the figures of the sensors for pressure, revolutions, temperature, and vibrations and can independently make a decision to switch off the emergency engine by way of closing of the shutters leading to the conduit pipes while notifying the autopilot. The autopilot can also give a command to the engine control segment to switch off the air-powered engine. The revolutions sensors are situated at the air-powered engines and measure the revolutions as well as the fact of rotation according to changes in the magnetic field of the air-powered engine blades during its rotation. The temperature sensors are located on the printed board of the controller and the controlled points: the shutters, engine frames, and conduit pipe. The vibration sensors are located at the points the engines are attached to the frame at. The pressure sensors are installed on the controller board and connected to the control points on the conduit pipe, engine, and shutters and measure the pressure relative to the atmosphere and pressure swings between the control points. Transmission of the controller commands and the collection of diagnostic information from the controller are implemented via the control cables and the radio channel, equivalent to the previous version of the technology.

Installation of a duplicate compressor and duplicate conduit pipes is possible with independent shutters (from the primary one) for compensating for damage during a flight; meanwhile, a duplicating compressor is installed inside the central section of the aerial vehicle frame along with the primary one in such a way not to disrupt the center of gravity of the vehicle; all the while, the duplicating conduit pipes pass inside the cluster in a route that does not coincide with the primary conduit pipes route in order to prevent simultaneous destruction. This is via the matrix method, where one control channel involved conduit pipes passing through transversely to the vehicle symmetry axis; meanwhile, the second channel goes along it (such linkage is possible on account of the cluster construction of the frame with repeating elements). In this case, two conduit pipes go to each air-powered engine from different sides and without repeating areas in the linkage route. The compressors have independent control systems, fuel equipment, and tanks. Installation is possible of a separate pressure source with compressed or liquefied gas instead of a primary or duplicate compressor.

The automatic control system fulfills the task of stabilizing the angular and spatial position of the AV, as well as the task of stabilizing the set altitude, by way of a selective change in the power of the motor installations clusters, by way of commands transmission by the engine controllers of each motor installation. The automatic control system consists of three independent autopilot boards, the operation control of which is implemented by a separate controller, via a majority method, according to the decisions they make. Each autopilot board contains a set of inertial transmitters (triaxial gyroscope and triaxial accelerometer), magnetic transmitter (compass), barometric altitude transmitter, and an air speed transmitter, manufactured according to a pressure transmitter differential scheme with "Pito pipe" type air intake, pyrometric horizon transmitters, as well as a satellite navigation system transmitter. The sensor readings are gathered in a central processor where they are combined and corrected with the help of a Kalman filter, as a result of which the true values of the vehicle orientation angles are obtained as well as the angular and linear speeds and accelerations. Based on these parameters, the central processor calculates the necessary force individually for each motor installations engine or by solution of the Navier-Stokes equations, meanwhile the motor installations of the cluster are represented as a vector field (the method provides the most accurate results for the cluster's universal dimensions, but also required maximal computational resources) or a vector resolution of the power of each motor installation onto the AV's center of mass in 3D space (the method requires trigonometric calculations with a floating point for each motor installations, but, meanwhile, less computative resources than the Navier-Stokes equations) or via Hooke's Law with diffusion, whereby each motor installation is represented as an inertial, elastic element, since it operates in an elastic gas (air) environment; meanwhile, the relationship between neighboring motor installations (power gradient) is described via a equation of diffusion onto the neighboring motor installations (the method provides the least precise results on account of dependence on the environment's elasticity determined by the altitude of the flight, although it can be easily broken down to integer calculations and via diffusion coefficients the load on the cluster motors situated at different distances from the center of mass can possibly be flexibly regulated, evening out their wear). The optimal method is vector resolution.

In the case of manual pilot control, the vehicle control system imitates ground transport control schemes well-known to the user, which he or she is used to, for which it contains controllers necessary to ground transport vehicles—a steering wheel and accelerator or brakes handles or pedals, for the option of only manual or a combination of manual/pedal control—which provides for control technology identical to a ground vehicle, motorcycle, or automobile, by way of a control system's processing (by autopilot) of controls signals and their transformations into commands for motor installations. The altitude of the flight is set by a separate handle and is automatically maintained by a control system (autopilot) over the course of the entire flight according to the readings of the transmitters group, such as a satellite navigation system transmitter, a barometric height transmitter, an optical (for low altitudes) and/or radio altimeter (for high altitudes), a radar, and an ultrasound range scope (for radio-transparent hindrances). This also enables the use of a ground transport control scheme on an aerial vehicle and reduces the entry threshold for the user along with ridding him or her of the necessity to study the piloting technology of aerial vehicles. Meanwhile, the nose wheel can be disassembled from the vehicle by way of disconnecting the easily removable "frog" latches and removing the connector pin connecting the nose wheel segment with the autopilot via a cable connection and used as an independent remote control for the vehicle in drone and remote pilot modes, for which purpose the control segment contains its own chargeable source of power and radio receiver transmitter.

Figure 2:
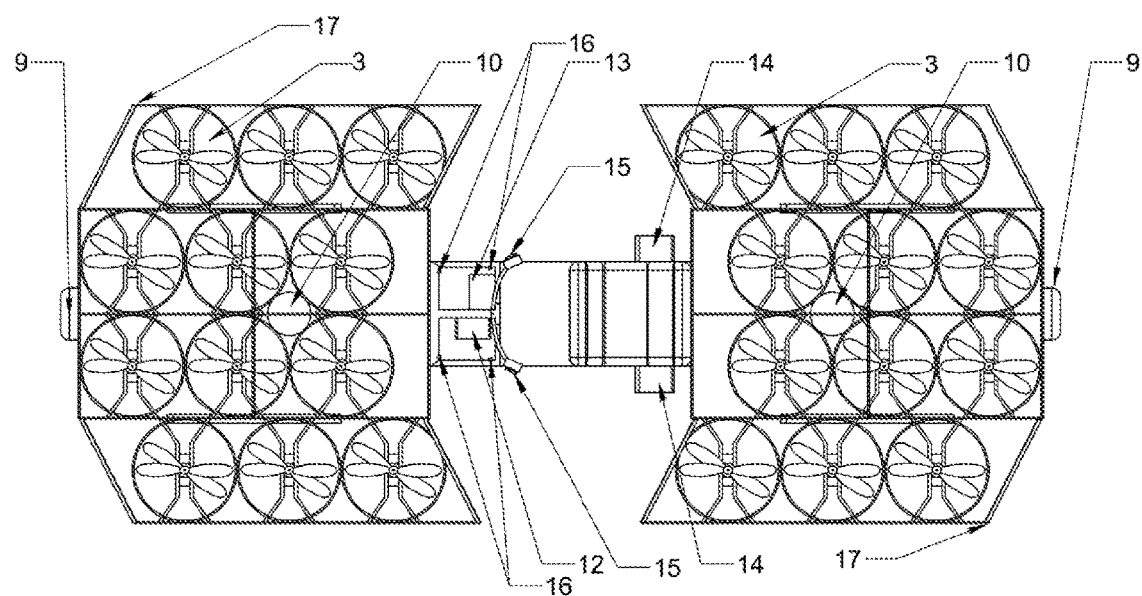
FIG. 2 depicts a top view for the two or more engines embodiment of the vertical take-off and landing aerial vehicle in the motor installation.
Figure 3:
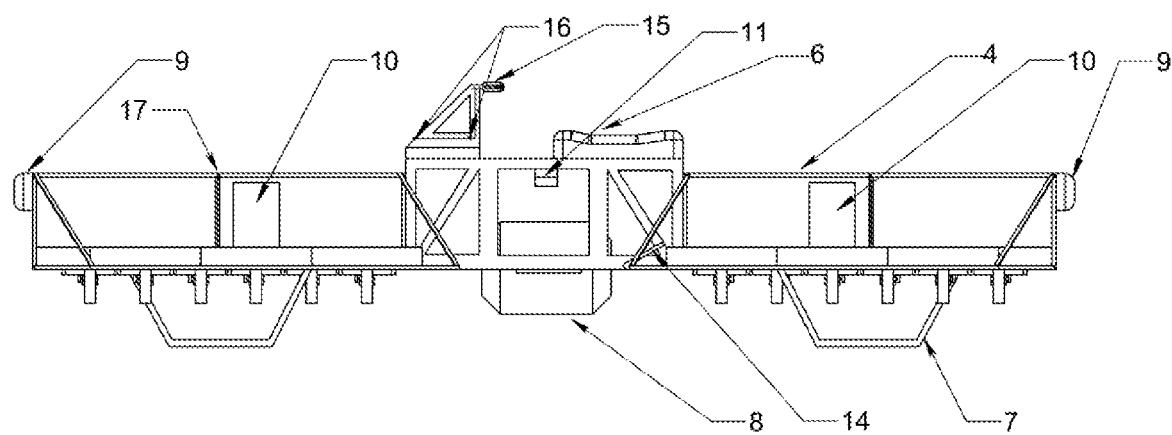
FIG. 3 depicts a side view of the vertical take-off and landing aerial vehicle, in accordance with at least one embodiment.
Figure 4:
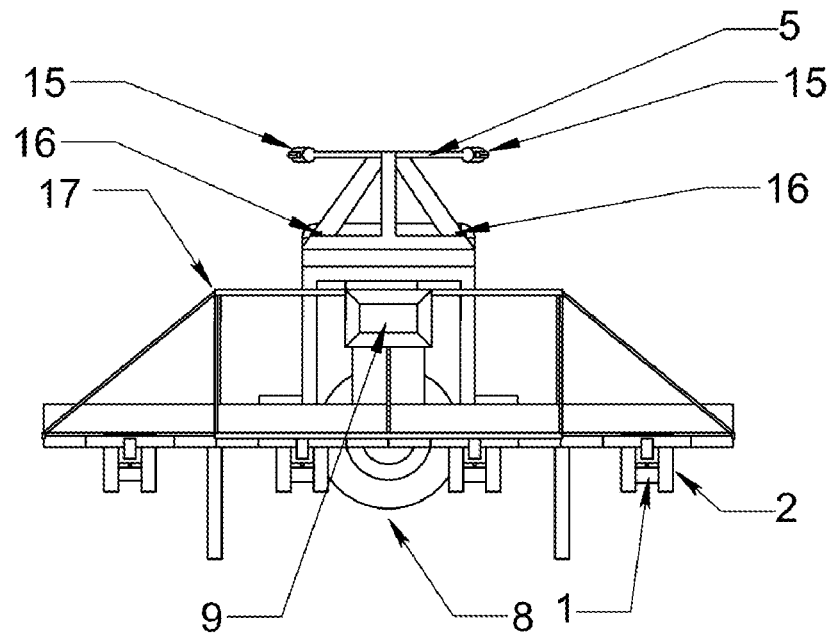
FIG. 4 depicts a Front view of the vertical take-off and landing aerial vehicle, in accordance with at least one embodiment.
Figure 5:
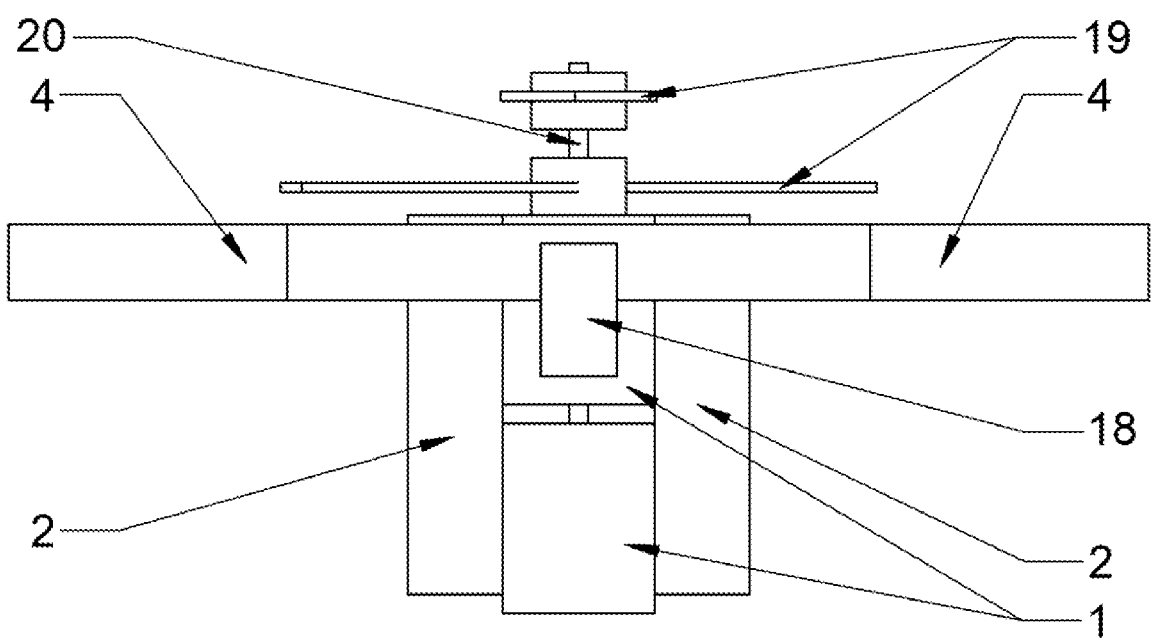
FIG. 5 depicts a side view of the electric type motor installation with two contra-rotating propellers, in accordance with at least one embodiment.
Figure 6:
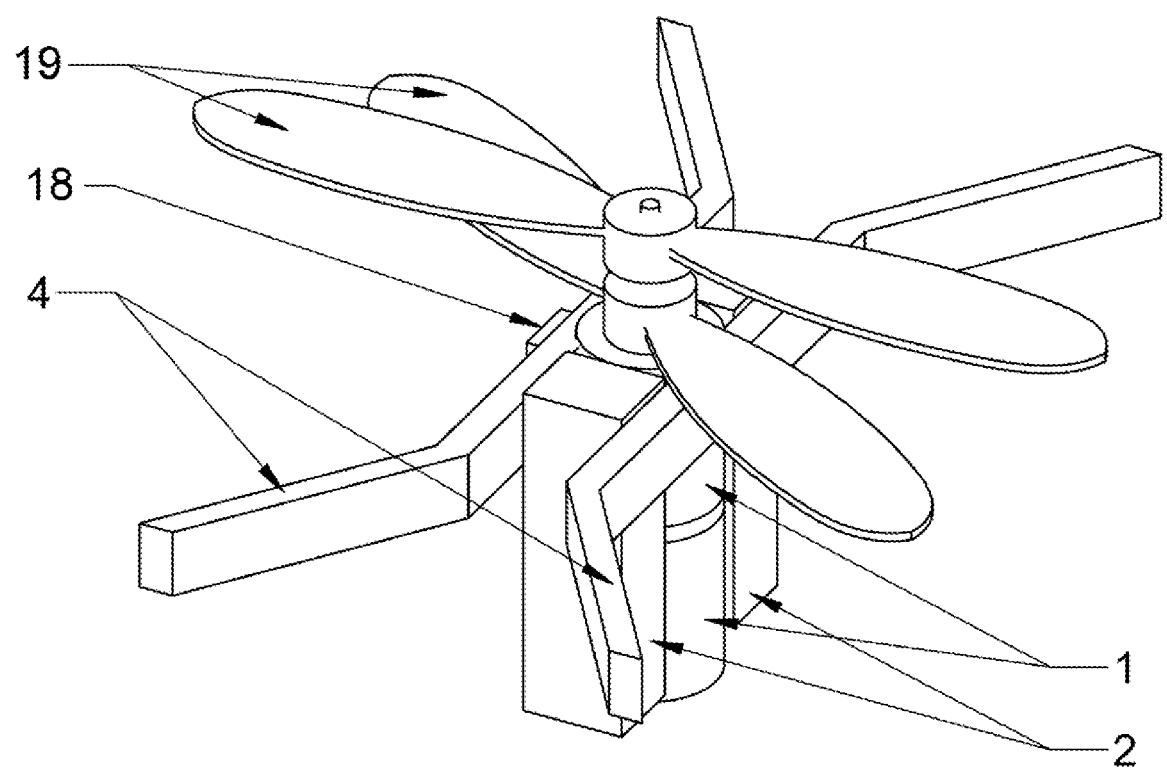
FIG. 6 depicts an overall view of the electric type motor installation with two contra-rotating propellers, in accordance with at least one embodiment.
Figure 7:
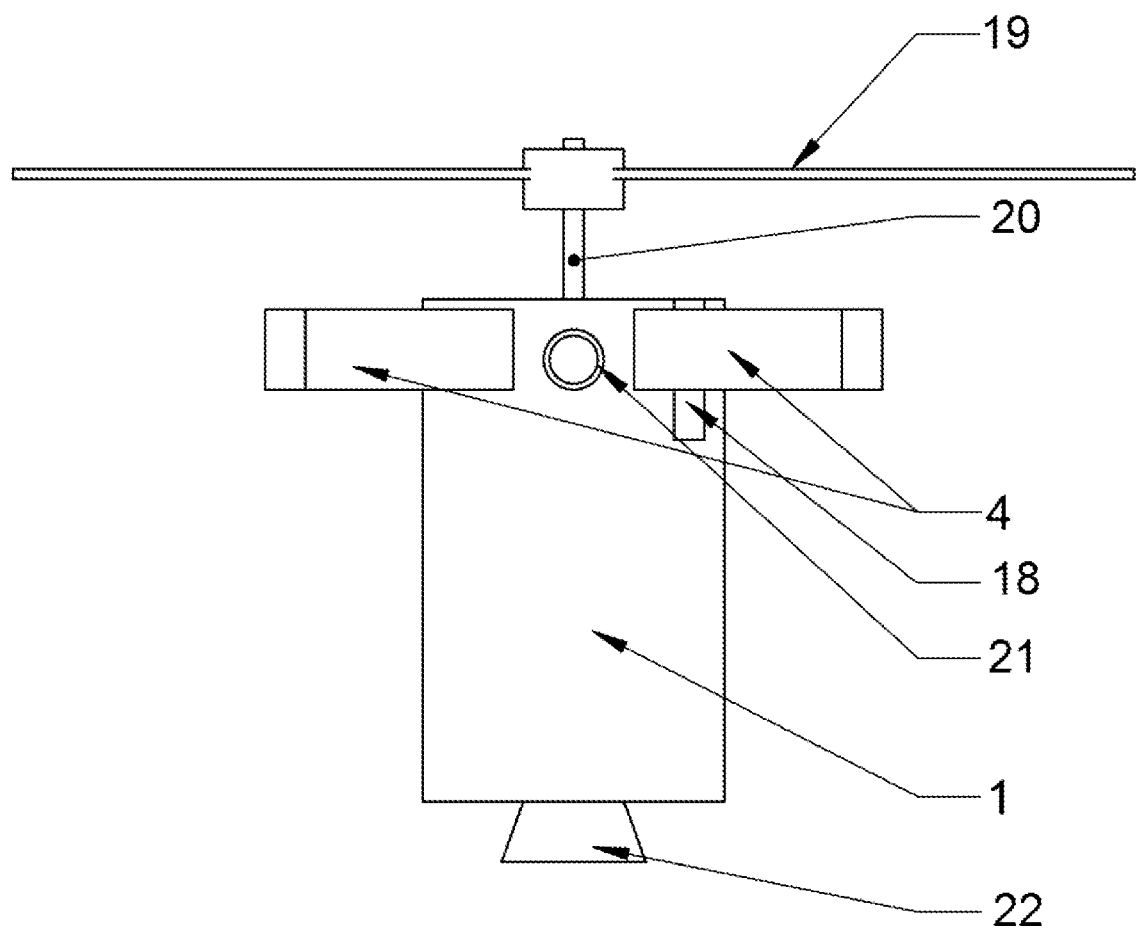
FIG. 7 depicts aside view of the air-powered type motor installation with one propeller, in accordance with at least one embodiment.
Figure 8:
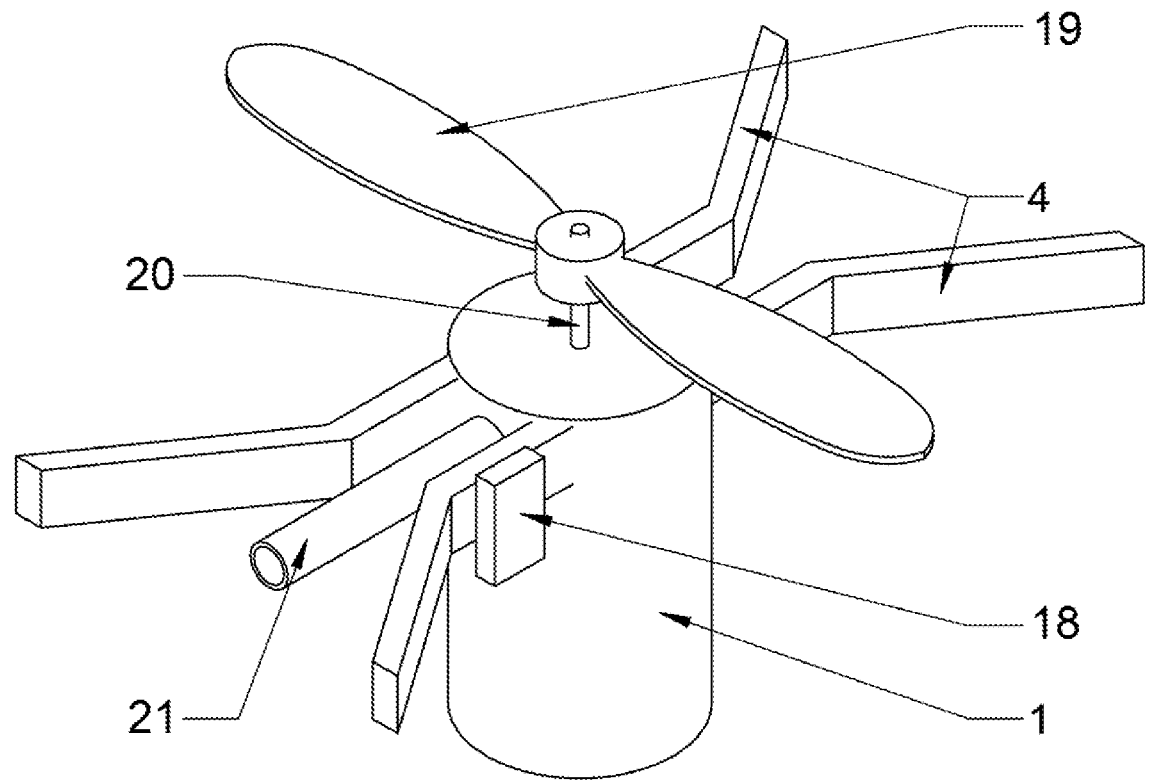
FIG. 8 depicts a perspective view of the air-powered type motor installation with one propeller, in accordance with at least one embodiment.
Figure 9:
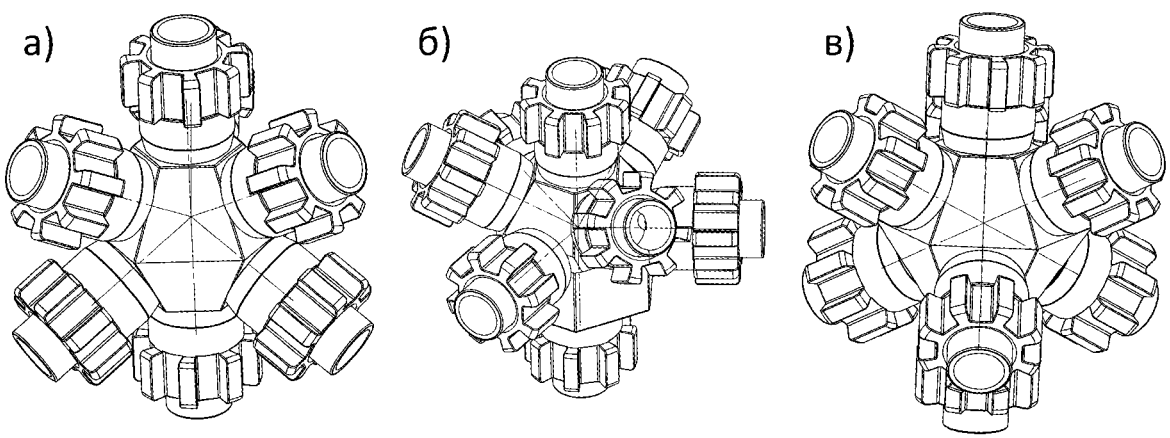
FIG. 9 depicts a quickly detachable lock connection frame nodes, where A is the internal frame connection node, B is the outer frame extremity node, and C is the internal frame connection node with a diagonal input.
Figure 10:
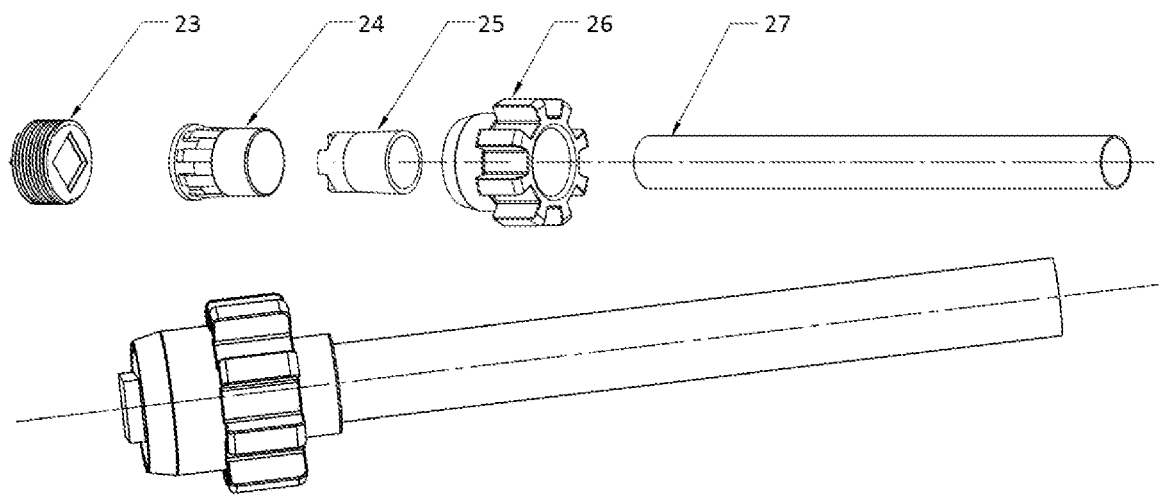
FIG. 10 depicts a construction of the frame node locking mechanism, in accordance with at least one embodiment.
Figure 11:
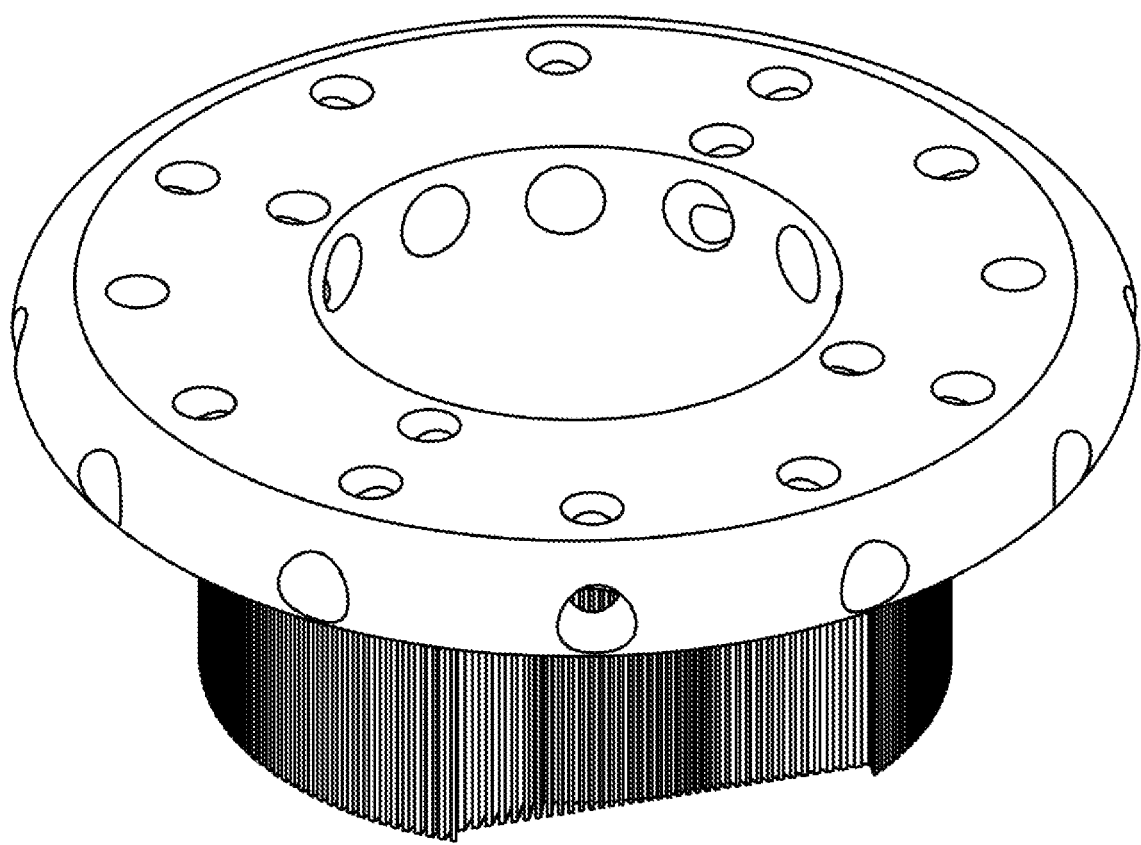
FIG. 11 depicts an engine attachment fitting, in accordance with at least one embodiment.
Figure 12:
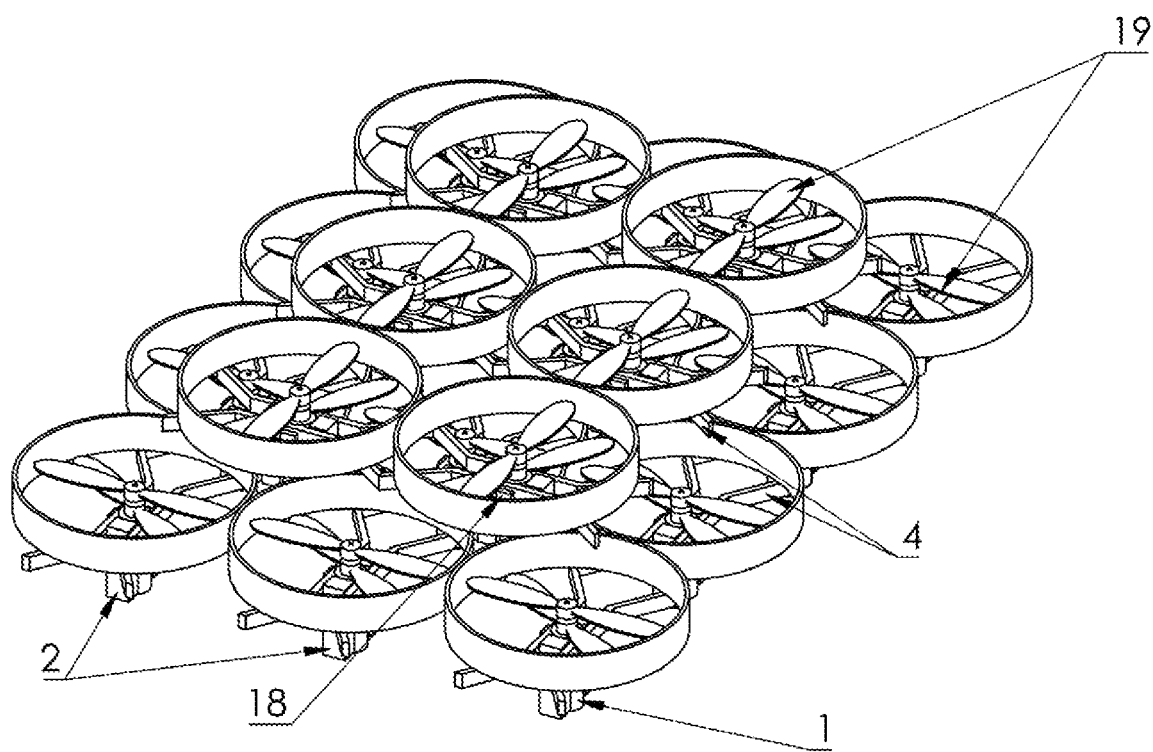
FIG. 12 depicts an example of a cluster manufacture with motor installations situated off-side each other in two planes, in accordance with at least one embodiment.

Thus, the combination of the characteristics that the presented aerial vehicle features, the implementation of which can be completed according to FIG. 1-FIG. 8, provides a basis for a small-scale, mobile, ecological, safe, and convenient stationary take-off aerial vehicle that is easy to repair, fail-safe, and inexpensive to operate, which allows the aerial vehicle to include emergency response, medical, and postal services as means of nearby flight in mountainous, marsh, and other types of land that are difficult to pass through, as a transportation vehicle for landing forces, in a warehouse or for surveillance, as a means of operation (in drone or remote pilot mode), as a flying crane for erecting engineering or fortification constructions, and a means of entertainment.

The invention claimed is:

1. A vertical take-off and landing aerial vehicle comprising:
   a base frame, the base frame including a central portion and at least two peripheral clusters, the central portion and the at least two peripheral clusters being implemented as a spacious construction, each peripheral cluster of the at least two peripheral clusters including at least three segments connected to each other;
   a seat mounted within the base frame;
   a control system for controlling operations of at least a portion of the vertical take-off and landing aerial vehicle; and
   a respective motor installation located in each segment of the at least three segments, the respective motor installation containing:
   at least one engine;
   at least one horizontal rotation propeller;
   an individual power supply source, having been installed within the respective motor installation, for powering on the at least one engine of the respective motor installation; and
   an individual engine controller having been installed within the respective motor installation, and being configured, by the control system, to control the at least one engine of the respective motor installation.

2. The aerial vehicle according to claim 1, wherein the at least two peripheral clusters are implemented as matching clusters made up of similar parts, such that the similar parts are at least partially interchangeable between one segment and another segment of the at least three segments.

3. The aerial vehicle according to claim 1, wherein the at least three segments are organized in a truss element, and wherein the at least three segments are limited in volume by truss elements formed by at least three facets; and wherein two neighboring truss elements share at least one facet manufactured as a unitary construction.

4. The aerial vehicle according to claim 1, wherein the respective motor installation is mounted in line and symmetrical in at least one horizontal plane to each other respective motor installation.

5. The aerial vehicle according to claim 1, wherein the respective motor installation is mounted in an off-set relationship relative to at least one other respective motor installation, the offset being in a horizontal plane.

6. The aerial vehicle according to claim 1, wherein the at least one engine is an electric engine; and wherein each of the respective motor installation comprises an electric power source mounted locally onto the respective motor installation, and wherein the electric power source is used to provide power to the associated electric engine, and wherein the electric power source is located in an air flow of the associated horizontal rotation propeller.

7. The aerial vehicle according to claim 6, wherein the electric engine comprises two electric engines coaxially located.

8. The aerial vehicle according to claim 1, further comprising an emergency power source switching system configured to switch powering of a given motor installation to a power source of another motor installation via a commutator system cable.

9. The aerial vehicle according to claim 6, wherein the electric power source comprises at least one of: fuel cells, radioisotope and nuclear electric power sources.

10. The aerial vehicle according to claim 1, wherein each respective motor installation is implemented as an independent unit with its own power source and a local instrumentation set configured to receive commands from a central control unit.

11. The aerial vehicle according to claim 1, wherein each respective motor installation comprises a pneumatic engine; and wherein the powering of each pneumatic engine is performed from a compressor installed in the central section, the powering being executed via a separate conduit pipe with a shutters system with electric actuation; and wherein the control system is configured for regulating the feeding of the compressed gas to pneumatic engines and their force.

12. The aerial vehicle according to claim 11, wherein the conduit pipes pass through either the inside or outside of the frame elements.

13. The aerial vehicle according to claim 11, wherein the compressor further comprises a pneumatic battery.

14. The aerial vehicle according to claim 11, wherein each pneumatic engine is an independent unit with its own pneumatic energy transfer channel from the compressor and the instrumentation set, receiving commands from a central control unit.

15. The aerial vehicle according to claim 11, further comprising a duplicate compressor and duplicate conduit pipes with independent shutters, the duplicate compressor being installed inside the central section of the aerial vehicle frame along with the primary one.

16. The aerial vehicle according to claim 1, wherein the central section houses seat, hand and foot controllers.

17. The aerial vehicle according to claim 1, wherein controllers are manufactured with a possibility of dismantlement along with a quickly removable connection and their use as a remote control for control of the vehicle at a distance in a drone mode.

18. The aerial vehicle according to claim 1, wherein each respective motor installation is controlled individually; and wherein each peripheral cluster comprises an equal number of: (i) motor installations having clockwise-rotatable propellers and (ii) motor installations having counterclockwise rotatable propellers.

19. The aerial vehicle according to claim 1, wherein each respective motor installation is controlled individually; and wherein each peripheral cluster comprises an even number of counterclockwise rotation propellers.

20. The aerial vehicle according to claim 1, further comprising automatic control system operating in at least one of a pilot mode, an autonomous drone mode, and in a remote control mode.

* * * * *